Patented Nov. 18, 1924.

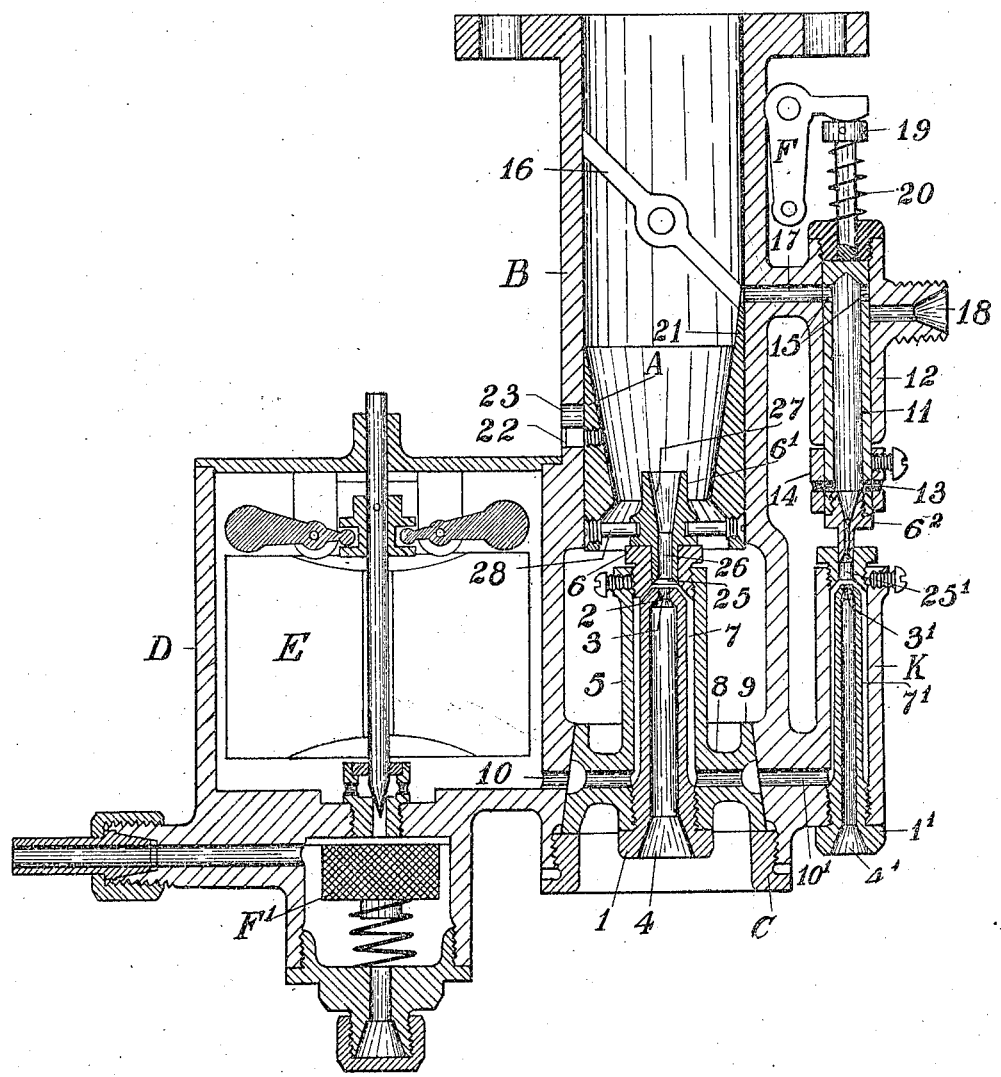

1,515,992

UNITED STATES PATENT OFFICE.

DANIEL BERTHELOT AND HENRI GUILBAUD, OF PARIS, FRANCE.

CARBURETOR.

Application filed September 16, 1919. Serial No. 324,033.

*To all whom it may concern:*

Be it known that we, DANIEL BERTHELOT and HENRI GUILBAUD, citizens of the Republic of France, residing at Paris and Meudon, Seine et Oise, both in the Republic of France, respectively, have invented certain new and useful Improvements in and Relating to Carburetors, of which the following is a specification.

This invention relates to improvements in carburetors for gasolene or light hydrocarbons, which yields an automatic discharge of liquid proportional to the volume of air aspirated by the engine, at all engine speeds.

In the accompanying drawing a longitudinal section of the improved carburetor, which forms the object of the invention, is illustrated, arranged with a view to its application to explosion or internal combustion motors.

This apparatus comprises a hollow stem 1, having at one of its ends a nozzle 2, perforated with a hole 3 of predetermined size the other end 4 being in communication with the atmosphere. The hollow stem 1, is screwed inside a sleeve 5, provided at its top end with a plug 6. By screwing up, or unscrewing the plug 6, the plug is approached to or removed from the nozzle.

The stem 1 is formed so as to leave between it and the inner wall of the sleeve 5, an annular space 7 extending to the jet 2.

The part 6 is cylindrically recessed and has a piece $6^1$ intended to form a variable mixing chamber sliding in it.

The piece $6^1$ is bored with a cylindrical hole 26 of predetermined length and diameter, coaxial with the hole 3, which hole places the chamber 5, the so-called mixing chamber, in communication with another chamber 27, having recessed walls known as the expansion chamber.

The external wall of the piece $6^1$ has a circular groove adapted to receive the end of one or more screws 28 firmly connecting it with a part A forming a movable choke tube.

The Venturi tube A slides with slight friction in the body B of the carburetor, its course is limited at its two extreme points by a screw 22 which it carries and which slides in a groove 23 formed in the body B.

The Venturi tube A is further provided with a tongue 21 automatically obstructing at one point of its course a pipe or passage 17.

The sleeve 5 has at its lower part one or more hollow arms 8 connected with a truncated conical ring 9 fitting in the body B of the carburetor and held locked by a nut C which allows of the whole arrangement being rapidly taken apart.

On the periphery of the truncated conical ring 9, a circular groove is arranged, placing in communication the annular chamber 7 with a pipe 10 communicating with a reservoir D kept at a constant level by means of a float E and having an ordinary filter F, and also with a pipe $10^1$ communicating with a small tube K similar to the principal jet, serving for starting and also for slow running.

16 indicates an ordinary throttle valve.

The float E is adjusted so as to maintain a constant predetermined level of the liquid in the annular space 7, and in the space $7^1$ of the tube K.

The starting and slow running arrangement K has the same parts; it is at all points similar to the principal jet arrangement but is of smaller dimensions. It constitutes itself a small carburetor.

The piece $6^2$ of the jet arrangement K, forming the variable mixture chamber, is screwed to the lower end of a recess 11 which slides with slight friction in a sleeve 12 cast on the body B of the carburetor. In the lower part of the said socket ports 13, adapted to be regulated by means of a suitable ring 14, ensure a suitable air admission. In its upper part, the socket 11 is perforated with two holes 15, which communicate, as desired, by the operation of a bell crank lever F, acting on a rod 19, and compressing a spring 20, with the slow running port 17 at the wing of the throttle 16, or with a pipe 18 called the starting pipe, for connection if desired to the upper part of the inlet manifold.

Considering the carburetor as mounted on an engine which starts with difficulty when cold, one of the ends of a small pipe is connected as has been stated, with the pipe 18 of the jet arrangement K, and the other end of the pipe with the part of the inlet manifold which is nearest to the cylinders. By depressing at the moment of starting, the bell crank F through the intermediary of a rod or cable within reach of the driver, the rod 19 is lowered compressing the spring 20, and brings the ports 15 of the sleeve 11 opposite the pipe 18; the part 6², sharing in the same movement diminishes the capacity of the mixing chamber 25¹ of the arrangement K, a position corresponding to the maximum aspiration of the liquid drawn in under the action of the depression of the pistons in the pipe 18, by air at atmospheric pressure entering through the port 4¹ of the hollow spindle 1¹ passing at high speed through the hole 3¹. Any additional air admission through the ports 13 is regulated once for all by means of a ring 14. The foregoing system ensures immediate starting even with difficult starting engines.

After the first explosions, the control F is released and the spring 20 causes the sleeve 11 to rise automatically to its initial point, thus placing the ports 15 opposite the slow running passage 17. The piece 6² operated by the same movement, increases the capacity of the mixing chamber 25¹, the position corresponding to the minimum suction of the liquid, and ensuring a perfect retardation.

Atmospheric air passes, on the one hand, through the annular space left free between the base of the diffuser and the part 6¹, after having penetrated into the apparatus passing round the arm or arms 8, and on the other hand through the port 4 of the hollow spindle 1. The air passing through this hollow spindle flows with great speed through the hole 3, carrying the liquid from the annular space 7, through the nozzle 2, into the mixing chamber 25. This mixture violently ejected through the hole 26 emerges into the expansion chamber 27 in the form of a very finely atomized vapour in order to be intimately mixed with the air admitted directly into the diffuser at a predetermined distance from the base of the latter. By increasing the opening of the throttle 16, the depression increasing with the speed of the motor, the choke tube A is lifted, carrying with it, owing to the screw 28, the piece 6¹, thus increasing the height of the mixing chamber 25.

In reality the discharge of liquid may be varied on two systems:—

1. Without changing the height of the mixing chamber by making the nozzle aperture gradually smaller relative to that in the expansion chamber. This modification in the difference between the two holes may only be a few tenths of a millimeter. This system does not permit of having a discharge which varies automatically with the degree of depression;

2. Without changing the diameters of the hole in the jet and the hole in the expansion chamber, but varying the height of the mixing chamber.

By combining system 1 and 2, it is thus possible by judicially choosing the difference in the diameter of the two holes in the nozzle and the expansion chamber respectively to obtain, at least to a certain extent, such a course as may be desired for the expansion chamber; the two extreme positions in the course, corresponding respectively to the maximum discharge and the minimum discharge which it is desired to give the apparatus. These two systems of varying the discharge thus supplement one another very well.

It must be pointed out that the tongue 21 carried by the diffuser A is arranged in such a way that at a pre-determined speed of the motor, the tongue closes the pipe 17 of the retarding arrangement, thus automatically isolating it from the action of the depression.

We declare that what we claim is:—

In a carburetor for an internal combustion engine a fuel nozzle comprising an outer fuel pipe, an inner air pipe, a hollow plug closing the end of the fuel pipe to leave an annular fuel spraying orifice, a hollow mouth-piece forming with the said plug and said inner pipe a mixing chamber, and means to vary the volume of the said mixing chamber, and a Venturi tube surrounding said mouth-piece and displaceable according to engine suction and means to connect said Venturi tube with said mouth-piece.

In witness whereof, we have hereunto signed our names this 25th day of August, 1919, in the presence of two subscribing witnesses.

DANIEL BERTHELOT.
HENRI GUILBAUD.

Witnesses:
ALPHONSE MEJEAU,
CHAS. PRESSLY.